(12) United States Patent
Lafferty

(10) Patent No.: US 7,019,827 B2
(45) Date of Patent: Mar. 28, 2006

(54) GIGAMATRIX HOLDING TRAY HAVING THROUGH-HOLE WELLS

(75) Inventor: William Michael Lafferty, Encinitas, CA (US)

(73) Assignee: Diversa Corporation, San Diego, CA (US)

(*) Notice: Subject to any disclaimer, the term of this patent is extended or adjusted under 35 U.S.C. 154(b) by 559 days.

(21) Appl. No.: 10/084,552

(22) Filed: Feb. 25, 2002

(65) Prior Publication Data

US 2002/0080350 A1 Jun. 27, 2002

Related U.S. Application Data

(63) Continuation-in-part of application No. 09/894,956, filed on Jun. 27, 2001, which is a continuation-in-part of application No. 09/687,219, filed on Oct. 12, 2000, which is a continuation-in-part of application No. 09/636,778, filed on Aug. 11, 2000, which is a continuation-in-part of application No. 09/444,112, filed on Nov. 22, 1999, which is a continuation of application No. 09/098,206, filed on Jun. 16, 1998, now Pat. No. 6,174,673, which is a continuation-in-part of application No. 08/876,276, filed on Jun. 16, 1997.

(51) Int. Cl.
*G01N 1/10* (2006.01)

(52) U.S. Cl. .................................... 356/246
(58) Field of Classification Search ............... None
See application file for complete search history.

(56) References Cited

U.S. PATENT DOCUMENTS

| | | | |
|---|---|---|---|
| 3,979,621 A | | 9/1976 | Yates |
| 4,587,213 A | * | 5/1986 | Malecki ................ 435/39 |
| 4,811,218 A | | 3/1989 | Hunkapillar |
| 5,038,852 A | | 8/1991 | Johnson |
| 5,121,320 A | | 6/1992 | Aoki |
| 5,427,663 A | | 6/1995 | Austin |
| 5,560,811 A | * | 10/1996 | Briggs et al. ........... 204/451 |
| 5,843,767 A | | 12/1998 | Beattie |
| 5,959,711 A | * | 9/1999 | Silverstein et al. ...... 349/159 |
| 6,027,873 A | | 2/2000 | Schellenberger |
| 6,129,896 A | | 10/2000 | Noonan et al. |
| 6,210,910 B1 | | 4/2001 | Walt et al. |
| 6,306,578 B1 | * | 10/2001 | Schellenberger et al. ..... 435/4 |
| 6,464,942 B1 | * | 10/2002 | Coffman et al. ........... 422/100 |
| 6,587,197 B1 | * | 7/2003 | Rahbar-Dehghan ........ 356/318 |

FOREIGN PATENT DOCUMENTS

| | | |
|---|---|---|
| EP | 1127692 A2 | 8/2001 |
| WO | WO 99/34920 | 7/1999 |
| WO | WO 01/38583 A2 | 5/2001 |
| WO | WO 02/12897 A2 | 2/2002 |

* cited by examiner

*Primary Examiner*—Zandra V. Smith
(74) *Attorney, Agent, or Firm*—Nydegger & Associates

(57) ABSTRACT

A GigaMatrix plate for holding a large number of small-volume fluid samples includes a base for supporting a plurality of substantially parallel, elongated capillary tubes. Each tube defines a lumen that extends through the base, and each lumen has an aspect ratio greater than about 5:1. Dimensionally, each lumen has an inner diameter that is less than approximately five hundred microns and it has a length greater than about five millimeters. Further, each tube acts to optically distinguish light that is directed toward it from the sample whenever the sample fluoresces inside the tube lumen. Also, however, light from the sample that is directed axially through the tube is emitted therefrom for optical detection of the tube and the sample therein.

22 Claims, 2 Drawing Sheets

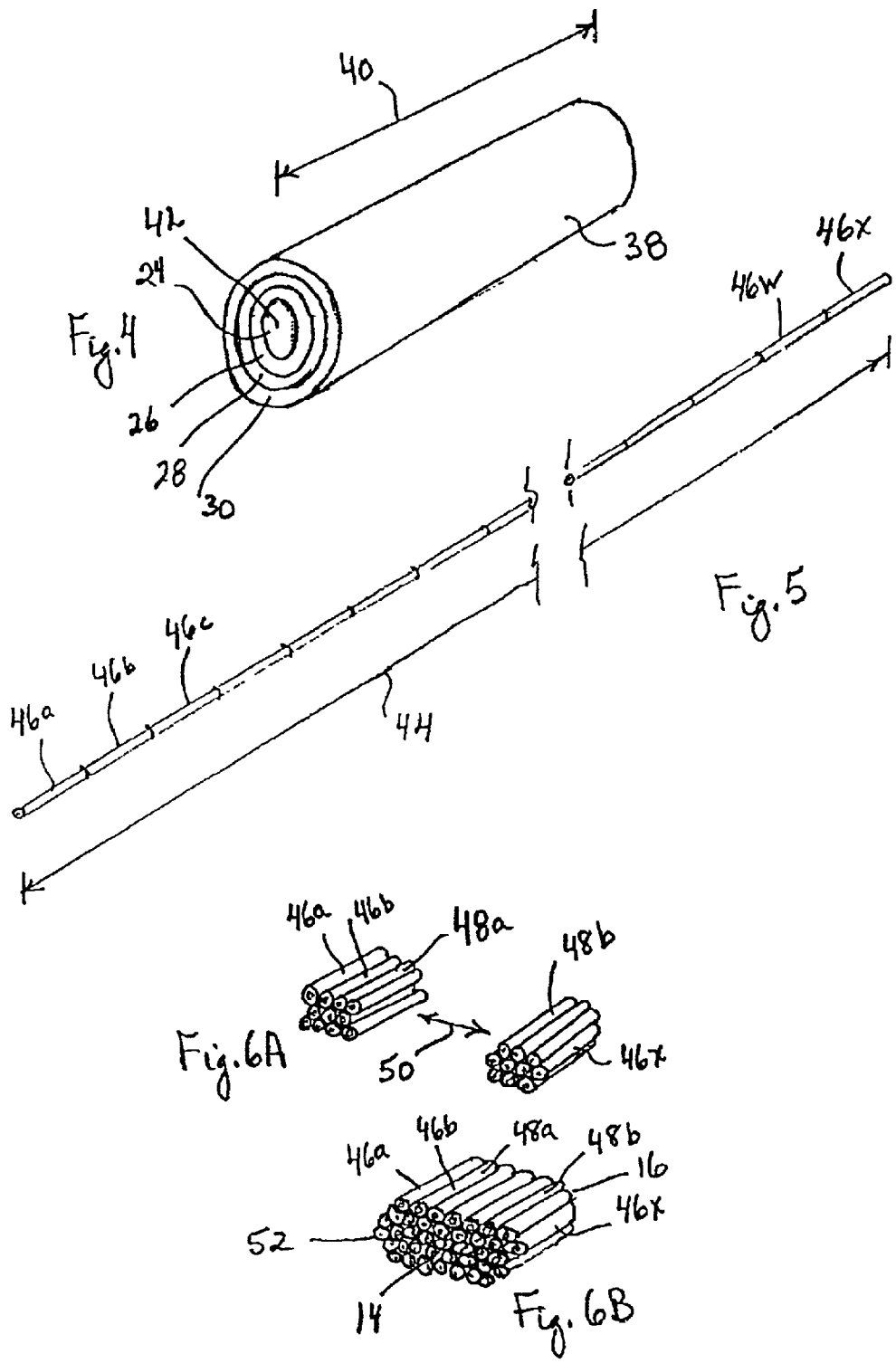

GIGAMATRIX HOLDING TRAY HAVING THROUGH-HOLE WELLS

The present application is a continuation-in-part of pending U.S. patent application Ser. No. 09/894,956 filed Jun. 27, 2001, which is a continuation-in-part of pending U.S. patent application Ser. No. 09/687,219, filed Oct. 12, 2000, which is a continuation-in-part of pending U.S. patent application Ser. No. 09/444,112, filed Nov. 22, 1999, which is a continuation-in-part of pending U.S. patent application Ser. No. 08/876,276, filed Jun. 16, 1997; additionally, the present application is a continuation-in-part of pending U.S. patent application Ser. No. 09/636,778, filed Aug. 11, 2000, which application is a continuation and claims the benefit of priority under 35 U.S.C. § 120 of U.S. patent application Ser. No. 09/098,206, filed Jun. 16, 1998, which issued as U.S. Pat. No. 6,174,673 on Jan. 16, 2001, which is a continuation-in-part of pending U.S. patent application Ser. No. 08/876, 276, filed Jun. 16, 1997, all of the contents of which are incorporated by reference in their entirety herein.

FIELD OF THE INVENTION

The present invention pertains particularly to plates for holding a large number of relatively small-volume fluid samples. More particularly, the present invention pertains to plates that are formed with a plurality of through-hole wells in which individual samples can be held. The present invention is particularly, but not exclusively, useful as a GigaMatrix™ plate that has a relatively large number of through-hole wells with relatively high aspect ratios, wherein each through-hole well can be optically distinguished from other through-hole wells in the plate.

BACKGROUND OF THE INVENTION

Plates or trays for holding assays or specimen samples in a fluid solution can be generally grouped into either one of two different types of devices. One type is formed with depressions or wells which have bottoms that support the assay or specimen while it is being processed. The other type incorporates through-hole wells that rely on surface tension to hold the fluid assay or sample in the through-hole well during processing. For example, U.S. Pat. No. 6,027,873 which issued to Schellenberger et al. for an invention entitled "Multi-Through Hole Testing Plate for High Throughput Screening" discloses a holding or testing plate of this second type. Not surprisingly, however, it happens that both types of holding plates have their respective advantages and disadvantages.

Insofar as holding plates having through-hole wells are concerned, one advantage they have is that they can be easily filled. Specifically, this can be done by simply immersing a surface of the holding plate into a solution to be analyzed. The through-hole wells are then filled with the solution by capillary action. This, in turn, leads to another advantage which is that a very large number of relatively small volume solution samples can be simultaneously prepared, but individually assayed.

As stated above, in addition to their advantages, sample holding plates also have their disadvantages. In particular, there is a significant disadvantage to presently available holding plates with through-hole wells. This disadvantage stems from the fact that the through-hole wells of presently available holding plates have aspect ratios (i.e. a ratio of the length of the well to its inner diameter) that are generally less than 5:1. Accordingly, a significant portion of the solution sample in the through-hole well is exposed to the environment. A consequence of this is that, due to evaporation, such plates can effectively support solution samples for only relatively short periods of time (e.g. minutes or a few hours). The present invention recognizes that through-hole wells having aspect ratios greater than 5:1 can effectively diminish the consequences of evaporation.

In addition to the advantages noted above, an attribute that is desirable for all types of holding plates is that they provide the ability to properly process the assays (samples) that are being held by the plate. Specifically, in some instances, it may be desirable or necessary to observe any changes in the sample that take place while it is being held by the plate. Such changes, however, may require several days, or even longer. In the particular case of holding plates with through-hole wells, the observation techniques that are being used must effectively account for the small volumes of the solution samples and their close proximity to each other on the holding plate. If optical techniques are used for these purposes, the individual through-hole wells of the holding plate must also be optically distinguishable.

In light of the above, it is an object of the present invention to provide a GigaMatrix holding plate with through-hole wells that have relatively high aspect ratios (e.g. greater than 5:1) to limit the effects of evaporation to approximately five percent of solution sample volume per day (5%/day). Another object of the present invention is to provide a GigaMatrix holding plate which allows respective through-hole wells to be optically distinguishable. Still another object of the present invention is to provide a GigaMatrix plate for holding a large number of small volume samples that is easy to use, relatively simple to manufacture and comparatively cost effective.

SUMMARY OF THE PREFERRED EMBODIMENTS

In accordance with the present invention, a GigaMatrix plate for holding a large number of relatively small solution samples includes a base having a first surface and an opposed second surface that is substantially parallel thereto. Open-ended capillary tubes extend through the base between its first and second surfaces to establish a plurality of substantially parallel through-hole wells. As envisioned for the present invention, the GigaMatrix holding plate can have in excess of a thousand such through-hole wells.

Each tube in the holding plate of the present invention has an interior surface that defines a lumen. This lumen further defines a longitudinal axis for the tube. Importantly, each tube has an aspect ratio (i.e. a ratio of lumen diameter to length of tube) that is greater than about 5:1. Within the parameters of such an aspect ratio, the lumen of each tube will have an inner diameter that is less than approximately five hundred microns, and a length that is greater than about five millimeters.

A contemplation of the present invention is that the plate will be used for holding samples in respective capillary tubes, and that these samples will fluoresce under appropriate conditions. With this in mind, it is an important aspect of the present invention that the holding plate be structured so that whenever a sample in a tube lumen is excited to become fluorescent, each tube will be independently and optically distinguishable from other tubes in the holding plate.

The structure of each tube in the holding plate can be made of a sleeve glass which is embedded in an interstitial material that holds the various tubes of the holding plate together on the base. For each tube, the sleeve glass surrounds the lumen of the tube. In one embodiment of the present invention, the sleeve glass itself is surrounded by a black, extra mural absorption (EMA) glass which absorbs most of the fluorescent light that is directed from the sample toward the tube. In another embodiment, the sleeve glass itself is heat-treated to make it effectively opaque and, thus, light absorptive for the above stated purposes. In yet another embodiment, the sleeve glass and interstitial material can be the same. Further, the glass in this last embodiment may be clear glass, but it should have refractive properties which make each tube optically distinguishable.

Additional aspects of the present invention include the fact that the interior surface of each tube lumen can be coated to control the tube's capillary action, or to provide a surface chemistry in the lumen. Also, a reference indicia can be established on the base of the plate for purposes of positioning and aligning the base, as required.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 4 is a perspective view of an optical fiber that would be suitable for use in manufacturing through-hole wells for the GigaMatrix plate of the present invention;

FIG. 5 is a perspective view of the optical fiber shown in FIG. 4 after it has been drawn down;

FIG. 6A is a perspective view of multis created by stacking sections of the drawn optical fiber shown in FIG. 5; and FIG. 6B is a perspective view of assembled multis for use in manufacturing the GigaMatrix plate of the present invention.

DESCRIPTION OF THE PREFERRED EMBODIMENT

Figure 1:
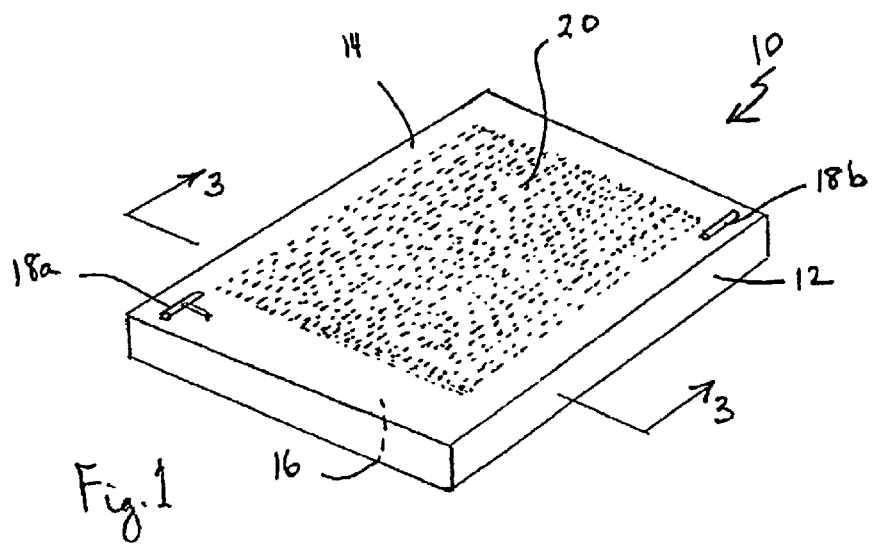
FIG. 1 is a perspective view of a GigaMatrix plate in accordance with the present invention.

Referring initially to FIG. 1, a GigaMatrix plate in accordance with the present invention is shown and is generally designated 10. As shown, the plate 10 includes a base 12 having a generally flat upper surface 14 and an opposed, also generally flat, lower surface 16. Reference indicia, such as the bumps or rises 18a and 18b shown in FIG. 1, can be used to orient and align the plate 10 as necessary during its use. Most importantly, however, is the fact that the plate 10 is formed with a plurality of through-hole wells 20 that extend through the base 12 between the upper surface 14 and the lower surface 16. As envisioned for the present invention, these through-hole wells 20 are all substantially parallel to each other, and they have a density of approximately two through-hole wells 20 per square millimeter of area on the surfaces 14, 16.

Figures 2A, 2B:
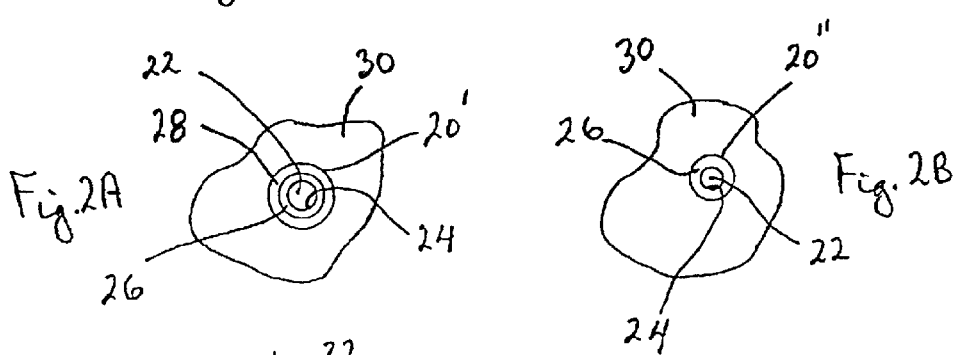
FIG. 2A is a top plan view of a portion of the GigaMatrix plate showing one embodiment of a through-hole well for the present invention.
FIG. 2B is a top plan view of a portion of the GigaMatrix plate showing an alternate embodiment of a through-hole well.

It is an important aspect of the present invention that the plate 10 be formed with a plurality of through-hole wells 20. For the present invention, this plurality may include as many as a thousand or more such wells 20. Structurally, the through-hole wells 20 are preferably any one of three possible embodiments. The first such embodiment, shown as the through-hole well 20' in FIG. 2A, is formed with a lumen 22 that is surrounded and defined by the interior surface 24 of an interior wall 26. Additionally, the through-hole well 20' (FIG. 2A) includes an outer wall 28 that surrounds the interior wall 26. For the second embodiment, shown as the through-hole well 20" in FIG. 2B, there is no outer wall 28. The difference in these structures, as more fully disclosed below, stems from the optical characteristics exhibited by the interior wall 26. Regardless, for both of these embodiments, the plate 10 includes an interstitial material 30 in which the through-hole well 20' (or 20") is embedded and held together in the base 12 with the other through-hole wells 20 of the plate 10. For the third embodiment, the interior wall 26, outer wall 28 and interstitial material 30 may all be the same.

As mentioned above, differences between the various embodiments for through-hole well 20 are dependent on the optical properties of their respective interior walls 26. For the through-hole well 20' (FIG. 2A) the interior wall 26 is preferably made of a sleeve glass that is of a type well known in the pertinent art. This sleeve glass alone, however, may not have the light absorptive properties that are preferred for the plate 10. If so, the outer wall 28 can be added and used to achieve the desired result. For this purpose, the outer wall 28 is preferably made of an extra mural absorptive (EMA) glass. On the other hand, for the through-hole well 20" (FIG. 2B) it is possible that the interior wall 26 be made of a sleeve glass which, after being heat-treated, will become substantially opaque. In either of these two cases, it is preferable that the through-hole wells 20 (either 20' or 20") have light absorptive characteristics that will minimize "cross-talk" (i.e. light interference) between adjacent through-hole wells 20 in the plate 10. Furthermore, if the inner wall 26, outer wall 28 and interstitial material 30 are all the same, it is important that the refractive properties of the material be such that the individual lumens 22 of the through-hole wells 20 can be optically distinguished from the material of the holding plate 10.

Dimensionally, the through-hole wells 20 of the plate 10 have several salient aspects. In all, there are two paramount aspects of the plate 10 that are particularly important. First is that the through-hole wells 20 function as capillary tubes that can be effectively filled by a wicking action. Second, and of equal importance, is that the through-hole wells 20 be configured to minimize the effects of evaporation. For the plate 10 of the present invention, both of these aspects are addressed by properly dimensioning the configuration of the through-hole wells 20.

Figures 3A, 3B:
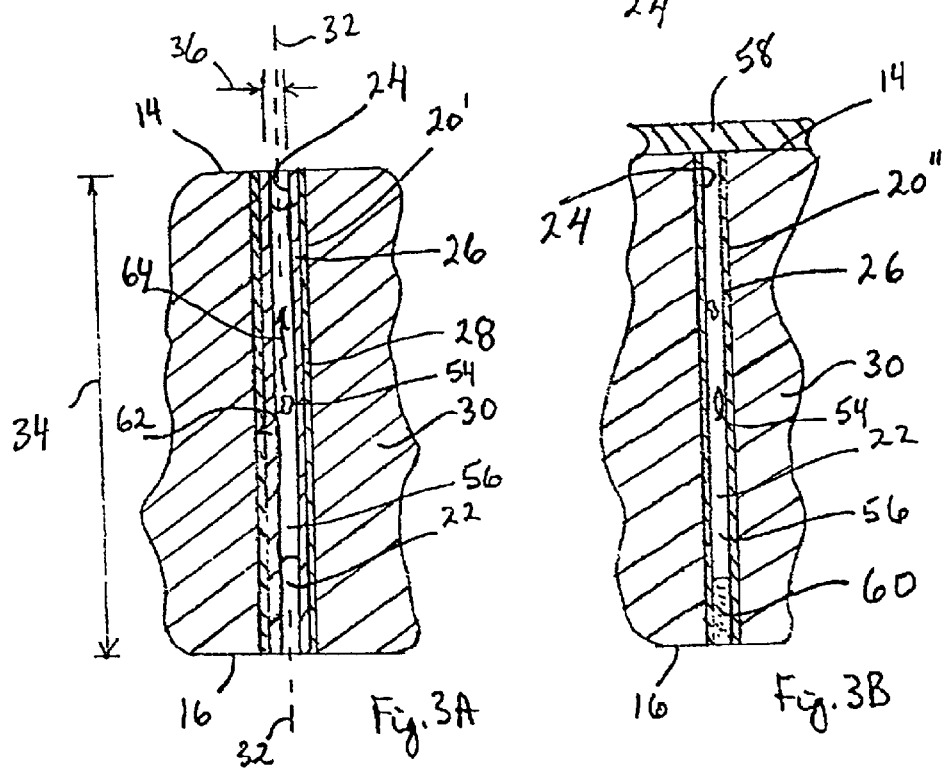
FIG. 3A is a cross sectional view of the through-hole well shown in FIG. 2A as would be seen along the line 3—3 in FIG. 1.
FIG. 3B is a cross sectional view of the through-hole well shown in FIG. 2B as would be seen along the line 3—3 in FIG. 1.

As perhaps best appreciated by cross referencing FIGS. 2A and 2B with FIGS. 3A and 3B, the through-hole wells 20 are preferably cylindrical in shape and define a longitudinal axis 32 (FIG. 3A). The cross-section of the through-hole wells 20, however, may be oval or rectangular. With these structures, each through-hole well 20 has a length 34 and an inner diameter 36. Specifically, the inner diameter 36 is the diameter of lumen 22. Importantly, these dimensions define an aspect ratio, "A", that for a through-hole well 20 is the ratio of its length 34 to its diameter 36. As intended for the present invention, "A" will be greater than approximately 5:1, and may be as much as 30:1, or more. Within the values of these parameters for "A", the length 34 is preferably in a range of about five to ten millimeters (5–10 mm) and the inner diameter 36 of the through-hole well 20 is preferably less than about five hundred microns (500 µm).

Manufacturing a GigaMatrix plate 10 in accordance with the present invention begins by providing a single elongated optical fiber 38, such as shown in FIG. 4. Specifically, the optical fiber 38 will have an initial length 40, and will include a cylindrical shaped core glass 42 that is surrounded by a concentric layer of sleeve glass. More specifically, this sleeve glass will eventually comprise the interior wall 26 of a through-hole well 20. As shown in FIG. 5, the outer wall 28, if used, and the interstitial material 30, in all instances, will be included in the optical fiber 38.

Once an optical fiber 38 has been selected, it is drawn down in a manner well known in the pertinent art to create an optical fiber having a length 44. As will be appreciated by comparing FIG. 4 with FIG. 5, the length 44 is much longer than the length 40. The drawn optical fiber 38 (FIG. 5) is then cut into a plurality of sections 46, of which the sections 46a, b, c . . . w and x are only exemplary. Next, the individual sections 46 are stacked together to create a so-called multi 48. As best seen with reference to FIGS. 6A and 6B, the sections 46 are stacked together in a substantially parallel arrangement, such as shown for the exemplary multis 48a and 48b. After the multis 48 have been created, they are then pressed together as indicated by the arrow 50, and heated to fuse the interstitial material. Although only the multis 48a and 48b are shown in FIG. 6A, it is to be appreciated that many such multis 48 can be fused together. Also, the process can be repeated to create multi-multis. Regardless how the multis 48 are made, the result is a unit assembly 52 that serves as a precursor for the plate 10.

After a plurality of the multis 48 have been pressed together, the resultant unit assembly 52 is carefully heated to fuse the interstitial material 30 between adjacent sections 46. For example, in order to avoid structural damage to materials in the unit assembly 52, this heating may be accomplished at relatively slow rates. Specifically, this is done to bond the sections 46 into an integral unit assembly 52. After cooling, the unit assembly 52 is cut and ground to establish a substantially same predetermined length for each of the sections 46. As a consequence of this, the surfaces 14 and 16 of the plate 10 are created with a distance between them that is preferably about six millimeters.

An important step in the manufacture of the GigaMatrix plate 10 of the present invention is that, after the unit assembly 52 has been cut and its surfaces 14 and 16 smoothed by grinding, the whole assembly 52 is immersed into an acid bath (not shown). This is specifically done to etch the core glass 42 from the assembly 52 to create the GigaMatrix plate 10. For the embodiment of plate 10 wherein the through-hole well 20" does not include the outer wall 28 of EMA glass, a final step in the manufacture of plate 10 can require heat-treating the plate 10 to make the sleeve glass of interior wall 26 substantially opaque.

In use, a surface 14 or 16 of the plate 10 is immersed into a container (not shown) that is holding samples 54 in a liquid solution 56. As intended for the present invention, this action wicks the samples 54 along with the liquid solution 56 into the through-hole wells 20 by a capillary action. The samples 54 are then held in the through-hole wells 20 to be subsequently assayed. Although the aspect ratio "A" that is manufactured for the through-hole wells 20 of plate 10 will act to minimize the effects of evaporation, this feature of the present invention can be supplemented. Specifically, as shown in FIG. 3B, a cap 58 can be used to cover the through-hole wells 20. Alternatively, a membrane (not shown) can be used for this purpose. Also, a wax, or a high vapor pressure fluid 60, can be inserted into the through-hole wells 20 to retard evaporation. Further, an obvious step for further reducing the effects of evaporation on the liquid solution 56 is to place the plate 10 in a humidified environment.

With the construction of the plate 10 as disclosed herein, it is possible to detect individual samples 54 in separate through-hole wells 20 if the samples 54 can be somehow excited to be fluorescent. Specifically, due to the light absorptive characteristics of the outer wall 28, or an appropriately heat-treated interior wall 26, each through-hole well 20 (capillary tube) will act as a light channel. On the other hand, to a lesser degree, the material of the holding plate 10, by itself, can have refractive properties that will allow the individual lumens 22 in the plate 10 to be optically distinguishable. With reference back to FIG. 3A, it can be seen that when fluorescent light is emitted by the sample 54, and is directed toward the interior surface 24 of the lumen 22, (e.g. as indicated by the arrow 62), the light will be refracted by the outer wall 28. One important consequence of this is that this refracted light can be distinguished from the light that is emitted from sample 54 and directed along the axis 32 will emerge from the through-hole well 20 (e.g. as indicated by the arrow 64). This light can then be used for the optical detection of the sample 54. Also, this light is sufficient to optically distinguish the particular through-hole well 20 in which the sample 54 is located from adjacent through-hole wells 20.

While the particular GigaMatrix Holding Tray Having Through-Hole Wells as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A plate which comprises:
   a base having a first surface and a second surface; and
   a plurality of substantially parallel elongated capillary tubes supported by said base, wherein each said tube has an interior wall presenting an interior surface to surround and define a lumen extending through said base between said first surface and said second surface, and an outer wall surrounding said interior wall and said lumen for absorbing light directed toward said interior surface of said interior wall, and further wherein each said tube defines a longitudinal axis and has an aspect ratio greater than about 5:1 with an inner diameter less than approximately five hundred microns, and further wherein each said tube acts to optically distinguish light directed from inside said lumen toward said interior surface thereof from light directed along said axis for optical detection of said tube.

2. A plate as recited in claim 1 further comprising a reference indicia established on said base for positioning and aligning said base.

3. A plate as recited in claim 1 wherein said interior wall is made of a sleeve glass.

4. A plate as recited in claim 3 wherein said outer wall is made of an extra mural absorption (EMA) glass.

5. A plate as recited in claim 1 wherein said tube is made of a sleeve glass, with said sleeve glass being heat treatable to make said tube opaque.

6. A plate as recited in claim 1 wherein said plate is used for holding samples in said capillary tubes, and wherein at least one said sample is excited to fluoresce and emit light for detection of said tube holding said fluorescent sample.

7. A plate for holding optically detectable samples which comprises:
a base made of an interstitial material and having a first surface and a second surface, with said second surface being substantially parallel to said first surface, wherein said base supports a plurality of substantially parallel through-hole wells, with each said through-hole well defining a longitudinal axis and extending between said first surface and said second surface, and wherein said plurality of through-hole wells have a density greater than approximately two wells per square millimeter on said first and second surfaces of said base; and
a material surrounding and defining a lumen for each said through-hole well to optically distinguish light directed substantially away from said axis in said lumen from light directed substantially along said axis in said lumen for optical detection of said through-hole well.

8. A plate as recited in claim 7 wherein each said through-hole well is a capillary tube having an aspect ratio greater than about 5:1 with an inner diameter less than approximately five hundred microns.

9. A plate as recited in claim 8 wherein said plate is used for holding samples in said capillary tubes, and wherein at least one said sample is excited to fluoresce and emit light for detection of said tube holding said fluorescent sample.

10. A plate as recited in claim 8 wherein said material of said through-hole well for each of said capillary tubes comprises:
an interior wall surrounding and defining said lumen; and
an outer wall surrounding said interior wall and said lumen.

11. A method of preparing samples for optical detection which comprises the steps of:
providing a plate comprising a base having a first surface and a second surface, and said plate has a plurality of substantially parallel, elongated capillary tubes supported by said base, wherein each said tube has an interior surface defining a lumen extending through said base between said first surface and said second surface, further wherein each said tube defines a longitudinal axis and has an aspect ratio greater than about 5:1 with an inner diameter less than approximately five hundred microns, and further wherein each said tube acts to optically distinguish light directed from said sample inside said lumen toward said interior surface thereof, from light directed from said sample along said axis for optical detection of said tube and said sample therein;
immersing said first surface of said base into a container holding said samples in a liquid solution to wick said samples into said tubes by a capillary action; and
positioning a cap on at least one said surface of said base to reduce evaporation of said liquid solution.

12. A method as recited in claim 11 further comprising the step of placing said plate in a humidified environment to reduce evaporation of said liquid solution.

13. A method as recited in claim 11 further comprising the step of placing a high vapor pressure fluid into said through-hole wells to protect said liquid solution from evaporation.

14. A method for manufacturing a plate for holding a large number of small volume fluid samples which comprises the steps of:
providing an elongated optical fiber having a first length, said optical fiber comprising a cylindrical shaped core glass surrounded by concentric layers of a sleeve glass and an interstitial material;
drawing down said optical fiber to a second length, said second length being longer than said first length;
cutting said drawn optical fiber into a plurality of sections;
stacking said sections to create a multi;
pressing a plurality of said multis together with said sections thereof substantially parallel to each other;
heating said plurality of multis to fuse said interstitial material between adjacent said sections to create an integral unit;
cutting said integral unit to establish a substantially same predetermined length for each said section; and
immersing said integral unit in acid to etch said core glass therefrom to create said plate with a base having a first surface and a second surface and a plurality of substantially parallel elongated capillary tubes supported by said base, wherein each said tube has an interior surface defining a lumen extending through said base between said first surface and said second surface, further wherein each said tube defines a longitudinal axis and has an aspect ratio greater than about 5:1 with an inner diameter less than approximately five hundred microns, and further wherein each said tube acts to optically distinguish light directed from inside said lumen toward said interior surface thereof, from light directed along said axis for optical detection of said tube.

15. A method as recited in claim 14 wherein said predetermined length for each said section is approximately six millimeters.

16. A method as recited in claim 14 further comprising the step of heat treating said plate to make said sleeve glass substantially opaque.

17. A method as recited in claim 14 wherein said optical fiber further comprises a concentric layer of EMA glass positioned between said sleeve glass and said interstitial material.

18. A plate which comprises:
a base having a first surface and a second surface; and
a plurality of substantially parallel elongated capillary tubes supported by said base, wherein each said tube has an interior surface defining a lumen extending through said base between said first surface and said second surface, further wherein each said tube defines a longitudinal axis and has an aspect ratio greater than about 5:1 with an inner diameter less than approximately five hundred microns, and further wherein each said tube acts to optically distinguish light directed from inside said lumen toward said interior surface thereof from light directed along said axis for optical detection of said tube and wherein said tube is made of a sleeve glass, with said sleeve glass being heat treatable to make said tube opaque.

19. A plate for holding optically detectable samples which comprises:
a base having a first surface and a second surface, with said second surface being substantially parallel to said first surface, wherein said base supports a plurality of substantially parallel through-hole wells wherein each said through-hole well is a capillary tube having an aspect ratio greater than about 5:1 with an inner diameter less than approximately five hundred microns, with each said through-hole well defining a longitudinal axis and extending between said first surface and said second surface, and wherein said plurality of through-hole wells have a density greater than approximately two wells per square millimeter on said first and second surfaces of said base; and a material surrounding and defining a lumen for each said through-hole well to optically distinguish light directed substantially away from said axis in said lumen from light directed substantially along said axis in said lumen for optical detection of said through-hole well, and wherein said material of said through-hole well for each of said capillary tubes includes an interior wall surrounding and defining said lumen, and an outer wall surrounding said interior wall and said lumen.

20. A method of preparing samples for optical detection which comprises the steps of:

providing a plate comprising a base having a first surface and a second surface, and said plate has a plurality of substantially parallel, elongated capillary tubes supported by said base, wherein each said tube has an interior surface defining a lumen extending through said base between said first surface and said second surface, further wherein each said tube defines a longitudinal axis and has an aspect ratio greater than about 5:1 with an inner diameter less than approximately five hundred microns, and further wherein each said tube acts to optically distinguish light directed from said sample inside said lumen toward said interior surface thereof, from light directed from said sample along said axis for optical detection of said tube and said sample therein;

immersing said first surface of said base into a container holding said samples in a liquid solution to wick said samples into said tubes by a capillary action; and placing a high vapor pressure fluid into said through-hole wells to protect said liquid solution from evaporation.

21. A plate as recited in claim 19 wherein said interior wall is made of a sleeve glass and said outer wall is made of an extra mural absorption (EMA) glass.

22. A plate as recited in claim 19 wherein said interior wall of each said lumen is coated to control the capillary action of each said through-hole well and said plate further comprises a reference indicia established on said base for positioning and aligning said base.

* * * * *